United States Patent
McConville et al.

(10) Patent No.: US 11,591,991 B1
(45) Date of Patent: Feb. 28, 2023

(54) METHODS AND SYSTEMS FOR MERGING EGR WITH INTAKE AIR

(71) Applicants: Ford Global Technologies, LLC, Dearborn, MI (US); FEV NORTH AMERICA INCORPORATED, Auburn Hills, MI (US)

(72) Inventors: Gregory McConville, Ann Arbor, MI (US); Liangjun Hu, Bloomfield Hills, MI (US); Mikhail Reytsman, Ann Arbor, MI (US); Tugrul Kesmer, Dearborn, MI (US); Anand Gupta, Dearborn, MI (US); Srinivas Kummarasetti, Dearborn, MI (US)

(73) Assignees: Ford Global Technologies, LLC, Dearborn, MI (US); FEV NORTH AMERICA INCORPORATED, Auburn Hills, MI (US)

( * ) Notice: Subject to any disclaimer, the term of this patent is extended or adjusted under 35 U.S.C. 154(b) by 0 days.

(21) Appl. No.: 17/446,276

(22) Filed: Aug. 27, 2021

(51) Int. Cl.
| | |
|---|---|
| *F02M 26/04* | (2016.01) |
| *F02M 26/17* | (2016.01) |
| *F02M 26/06* | (2016.01) |
| *F02M 26/09* | (2016.01) |
| *F02M 26/19* | (2016.01) |

(52) U.S. Cl.
CPC ............ *F02M 26/04* (2016.02); *F02M 26/06* (2016.02); *F02M 26/09* (2016.02); *F02M 26/17* (2016.02); *F02M 26/19* (2016.02)

(58) Field of Classification Search
CPC ........ F02M 26/04; F02M 26/06; F02M 26/09; F02M 26/17; F02M 26/19
See application file for complete search history.

(56) References Cited

U.S. PATENT DOCUMENTS

| | | |
|---|---|---|
| 7,721,542 B2 | 5/2010 | Chen |
| 8,776,517 B2 | 7/2014 | Ernst et al. |
| 9,091,275 B2 | 7/2015 | Chen |
| 9,228,488 B2 | 1/2016 | Atz et al. |
| 9,359,976 B2 | 6/2016 | Keating et al. |
| 10,012,184 B2 | 7/2018 | Guidi |
| 2007/0256413 A1 | 11/2007 | Marsal et al. |
| 2011/0214421 A1* | 9/2011 | Schmitt .................. F02M 26/09 60/605.2 |
| 2012/0023930 A1 | 2/2012 | Lischer |
| 2012/0048246 A1 | 3/2012 | Takagi et al. |
| 2019/0024574 A1* | 1/2019 | Upadhyay ............. F04D 29/685 |

(Continued)

FOREIGN PATENT DOCUMENTS

| | | |
|---|---|---|
| CN | 102230429 A | 11/2011 |
| CN | 103306858 A | 9/2013 |
| CN | 106884746 A | 6/2017 |

(Continued)

*Primary Examiner* — Audrey B. Walter
(74) *Attorney, Agent, or Firm* — Vincent Mastrogiacomo; McCoy Russell LLP

(57) ABSTRACT

Methods and systems are provided for merging recirculated exhaust gas (EGR) with fresh intake air in an intake passage. In one example, a method may include introducing EGR to the intake passage via an angled annular slot and flowing unmixed EGR and ambient air through an intake compressor inlet. Ambient air may flow to a center of the intake compressor while the EGR may flow along a periphery of the intake compressor inlet.

5 Claims, 3 Drawing Sheets

(56) References Cited

U.S. PATENT DOCUMENTS

2020/0191165 A1\* 6/2020 Rolandson .............. F04D 17/10

FOREIGN PATENT DOCUMENTS

| DE | 102013106748 A1 | | 1/2014 | |
|----|----|----|----|----|
| DE | 102015200053 B4 | \* | 3/2017 | ................ F02C 3/34 |
| GB | 2535995 A | \* | 9/2016 | .............. F02B 33/40 |
| GB | 2535996 A | \* | 9/2016 | .............. F02B 33/40 |
| JP | H0561445 U | \* | 8/1993 | |
| JP | 2013087720 A | \* | 5/2013 | |
| JP | 2014136977 A | \* | 7/2014 | |

\* cited by examiner

METHODS AND SYSTEMS FOR MERGING EGR WITH INTAKE AIR

FIELD

The present description relates generally to methods and systems for merging recirculated exhaust gas with fresh intake air in an intake passage.

BACKGROUND/SUMMARY

Engine systems may utilize recirculation of exhaust gas from an engine exhaust system to an engine intake system, a process referred to as exhaust gas recirculation (EGR), to reduce regulated emissions. An EGR valve may be controlled to achieve a desired intake air dilution for the given engine operating conditions. Traditionally, the amount of low pressure EGR (LP-EGR) and/or high pressure EGR (HP-EGR) routed through the EGR system is measured and adjusted based on engine speed, engine temperature, and load during engine operation to maintain desirable combustion stability of the engine while providing emissions and fuel economy benefits. EGR effectively cools combustion chamber temperatures thereby reducing NOx formation. Also, EGR reduces pumping work of an engine resulting in increased fuel economy. Prior to introduction of the EGR along with fresh air (entering the engine intake system) into the combustion chambers, it is desirable to uniformly mix the EGR with the fresh air.

One way to mix the LP-EGR with fresh air is by introducing the EGR to the intake passage carrying the fresh air upstream of an intake compressor. One example of such mixing system is provided by Atz et al. in U.S. Pat. No. 9,228,488B. Therein, in order to facilitate mixing of recirculated exhaust gas with intake air, a duct carrying EGR is introduced at an angle to the intake passage upstream of the intake compressor. The intake air and the EGR are mixed upstream of the compressor and the fluid mixture flows through the compressor.

However, the inventors herein have recognized potential issues with such a system. As one example, due to the difference in density of EGR and fresh air, the EGR may not be uniformly mixed upon introduction upstream of the compressor. As the EGR and fresh air (combination of fluids) passes through the blades of the compressor, fluid of different densities and temperatures may pass through different regions of the blades. Due to the un-uniform mixing, the densities and temperatures of fluids passing through each region of the blades may change constantly. As the blades are subjected to continually varying conditions (such as density and temperature), the operation of the compressor may be adversely affected causing reduction in compressor efficiency. Due to packaging constraints, there may not be sufficient space upstream of the compressor to include a mixer for improved EGR and fresh air mixing prior to the mixture entering the compressor. Further, addition of mixers to the intake passage may cause pressure losses in the intake passage.

In one example, the issues described above may be addressed by a method for an engine comprising: flowing unmixed recirculated exhaust gas (EGR) and ambient air into an intake compressor with the ambient air flowing to a center of the intake compressor and the EGR flowing along a periphery of the intake compressor inlet. In this way, by maintaining the EGR and fresh air separated as they pass into the compressor, uniformity of fluid flow through the compressor may be improved.

As one example, an end of an EGR passage carrying the recirculated exhaust gas (referred herein as EGR) may enclose the intake passage upstream of the compressor. The EGR passage may be configured with an asymmetric wall to introduce EGR to the intake passage via an annular slot. The angular slot may be configured to form a non-zero angle with a horizontal plane and may deliver the EGR proximal to a wall (periphery) of the intake passage. The EGR may enter the intake passage and flow along the periphery (along the wall) of the passage while the fresh air flowing through the intake passage may flow through the central portion of the intake passage. The EGR flow is maintained substantially parallel to the fresh air flow as the fluid enter the compressor. At the compressor, each region of the compressor blades are subjected to a specific fluid (EGR or fresh air) over the course of the operation. The portion of the blades near the center of the compressor (center of the fluid flow field) may be exposed to cooler fresh air while the outer portion of the compressor (periphery of the fluid flow field) may be exposed to the hotter EGR. The EGR may be thoroughly mixed with the fresh air as the fluids exit the compressor and flow through a charge air cooler and an intake throttle.

In this way, by reducing variation in density and temperature of fluid passing through any single portion of compressor blades, compressor operation and efficiency may be improved. Consistency of properties of fluids flowing through each region may reduce any wear to the compressor blades and improve robustness of the system. The technical effect of introducing the EGR at an angle proximal to the wall of the intake passage is that a stratified flow of EGR and fresh air may be maintained without mixing of the fluid streams as they flow into the compressor. Overall, by maintaining the fluids separate within the compressor inlet and then mixing the fluid, compressor efficiency may be improved without addition of any separate mixer component.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2 is shown approximately to scale.

DETAILED DESCRIPTION

Figure 1:
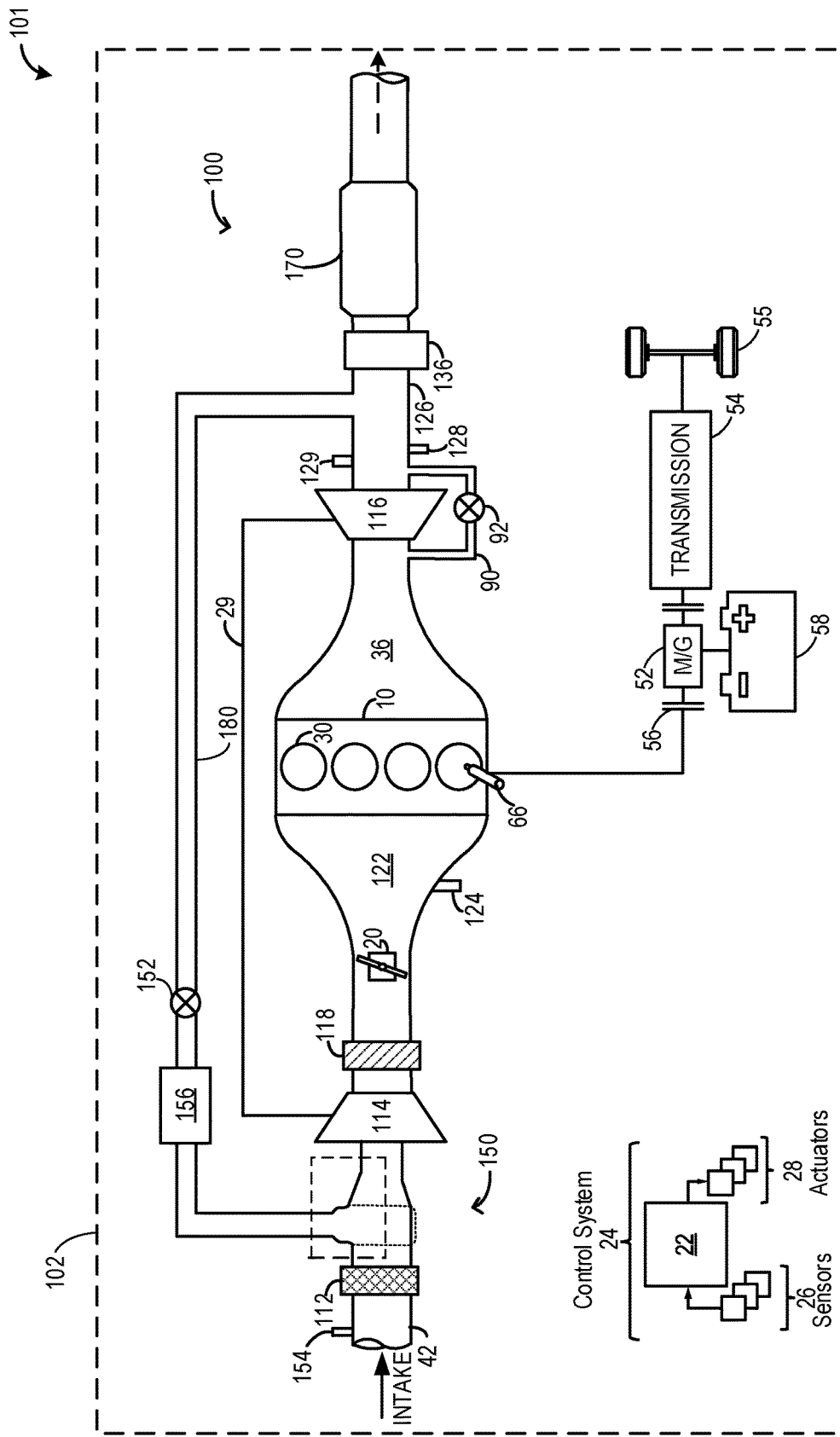
FIG. 1 shows a schematic diagram of an engine system including an exhaust gas recirculation (EGR) system.
Figure 2:
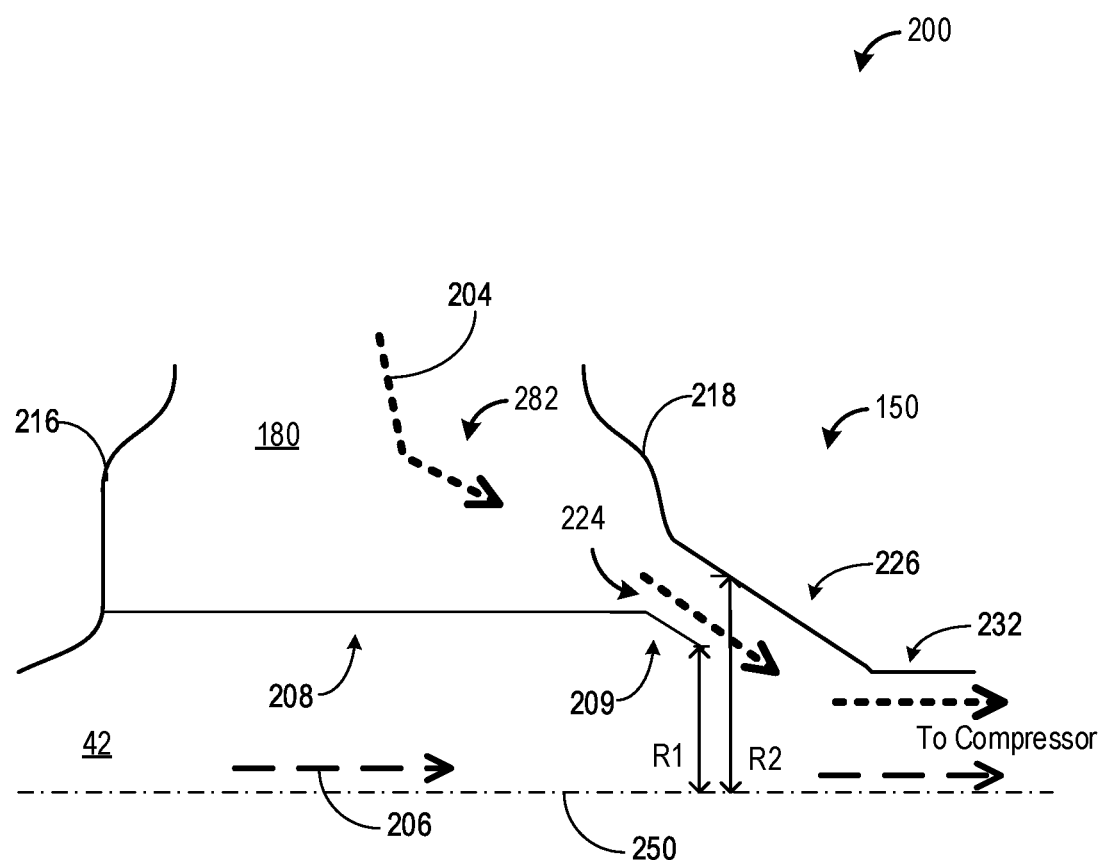
FIG. 2 shows a schematic diagram showing details of an EGR passage merging with an intake passage of the engine of FIG. 1.
Figure 3:
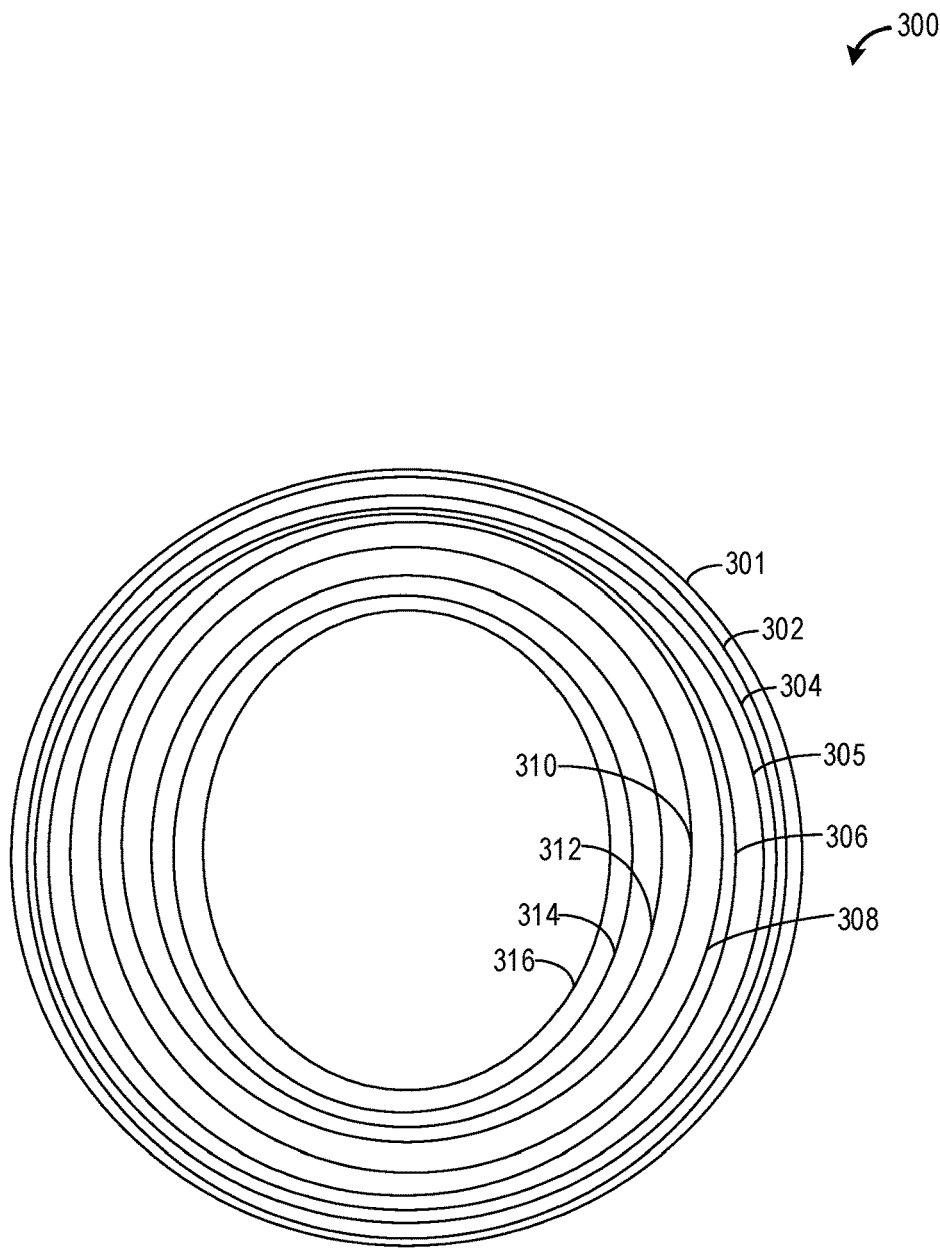
FIG. 3 shows a map of temperature variation within the intake passage immediately upstream of an intake compressor.

The following description relates to systems and methods for merging recirculated exhaust gas with fresh intake air in an intake passage of an engine system, such as an engine system shown in FIG. 1. Details of the geometry of the EGR passage and the intake passage allowing stratified flow of EGR and fresh air upon merging of the two fluids are shown in FIG. 2. Due to the stratified flow of EGR and fresh air, a temperature gradient is generated within the intake passage between the point of merger of the EGR passage with the intake passage and the intake compressor. The temperature gradient within the intake passage is schematically shown in FIG. 3.

FIG. 1 shows a schematic view 101 of a vehicle system 102 with an example engine system 100 including an engine 10. In one example, the engine system 100 may be a diesel engine system. In another example, the engine system 100 may be a gasoline engine system. In the depicted embodiment, engine 10 is a boosted engine coupled to a turbocharger including a compressor 114 driven by a turbine 116. Specifically, fresh air is introduced along intake passage 42 into engine 10 via air cleaner 112 and flows to compressor 114. The compressor 114 may be any suitable intake-air compressor, such as a motor-driven or driveshaft-driven supercharger compressor. In engine system 10, the compressor 114 is a turbocharger compressor mechanically coupled to turbine 116 via a shaft 29, the turbine 116 driven by expanding engine exhaust.

Compressor 114 is coupled through charge-air cooler (CAC) 118 to throttle valve 20. Throttle valve 20 is coupled to engine intake manifold 122. From the compressor, the compressed air charge flows through the charge-air cooler 118 and the throttle valve 20 to the intake manifold 122. In the embodiment shown in FIG. 1, the pressure of the air charge within the intake manifold 122 is sensed by manifold air pressure (MAP) sensor 124. Temperature of ambient air entering the intake passage 42 may be estimated via an intake air temperature (IAT) sensor 154.

One or more sensors (not shown) may be coupled to an inlet of compressor 114. For example, a temperature sensor may be coupled to the inlet for estimating a compressor inlet temperature, and a pressure sensor may be coupled to the inlet for estimating a compressor inlet pressure. As another example, an ambient humidity sensor may be coupled to the inlet for estimating a humidity of aircharge entering the intake manifold. Still other sensors may include, for example, air-fuel ratio sensors, etc. In other examples, one or more of the compressor inlet conditions (such as humidity, temperature, pressure, etc.) may be inferred based on engine operating conditions. In addition, the sensors may estimate a temperature, pressure, humidity, and air-fuel ratio of the air charge mixture including fresh air, recirculated compressed air, and exhaust residuals received at the compressor inlet.

A wastegate actuator 92 may be actuated open to dump at least some exhaust pressure from upstream of the turbine to a location downstream of the turbine via wastegate 90. By reducing exhaust pressure upstream of the turbine, turbine speed can be reduced, which in turn helps to reduce compressor surge.

Intake manifold 122 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance.

Combustion chambers 30 may be supplied with one or more fuels, such as gasoline, alcohol fuel blends, diesel, biodiesel, compressed natural gas, etc., via injector 66. Fuel may be supplied to the combustion chambers via direct injection, port injection, throttle valve-body injection, or any combination thereof. In the combustion chambers, combustion may be initiated via spark ignition and/or compression ignition.

A plurality of sensors, including an exhaust temperature sensor 128, an exhaust oxygen sensor, an exhaust flow sensor, and exhaust pressure sensor 129 may be coupled to the main exhaust passage 126. The oxygen sensor may be linear oxygen sensors or UEGO (universal or wide-range exhaust gas oxygen), two-state oxygen sensors or EGO, HEGO (heated EGO), a NOx, HC, or CO sensors.

Exhaust gas recirculation (EGR) delivery passage 180 may be coupled to the exhaust passage 126 downstream of turbine 116 to provide low pressure EGR (LP-EGR) to the engine intake passage, upstream of compressor 114. An EGR valve 152 may be coupled to the EGR passage to regulate EGR flow through the EGR passage 180. EGR valve 152 may be opened to admit a controlled amount of exhaust to the compressor outlet for desirable combustion and emissions control performance. EGR valve 152 may be configured as a continuously variable valve or as an on/off valve. An EGR cooler 156 may be coupled to the EGR passage 180 either upstream or downstream of EGR valve 152. The EGR cooler may substantially reduce the temperature of EGR gasses passing through it, but gasses exiting the EGR cooler may still be hotter than fresh air entering intake passage 42.

In order to regulate the merging of EGR flowing into the intake passage 42, the junction 150 of the EGR passage 180 is configured to introduce EGR to the intake passage through an angled annular slot that surrounds the intake passage. The end of the EGR passage 180 at the junction 150 may enclose the intake passage 42 and EGR may be introduced to the intake passage 42 along the periphery of the intake passage. The end of the EGR passage 180 may include a first curved wall directly merging with a first straight section of the intake passage 42 upstream of the annular slot, and a second curved wall merging with a second straight section of the intake passage downstream of the annular slot via an angled section of the EGR passage 180. The first curved wall and the second curved wall may be asymmetric about a central plane of the EGR passage 180. The annular slot may be formed between the angled section of the EGR passage 180 and an angled section of the intake passage 42 between the first straight section of the intake passage and the second straight section of the intake passage 42.

The introduction of the EGR to the intake passage 42 may be at the angle relative to a horizontal plane via the annular slot. The flow of EGR in the EGR passage 180 may be substantially parallel to the flow of ambient air through the intake passage 42 between the junction and the intake compressor 114, and through the intake compressor 114. A speed of the flow of EGR may be different from (higher or lower) from a speed of the flow of the ambient air through the intake passage 42 between the junction and the compressor 114. The speed of the flow of EGR may be a function of a difference between a radius of the EGR passage 180 (at the annular slot) and a radius of the intake passage 42 at the junction. EGR speed may also be a function of the percentage of EGR within the total inducted flow. Upon introduction of the EGR to the intake passage 42, the flow of EGR may be proximal to the wall of the intake passage while the flow of ambient air may be through a central region of the intake passage between the junction and the compressor. A temperature of the flow of EGR proximal to the wall of the intake passage may be higher than a temperature of the flow of ambient air through the central region of the intake passage between the junction and the compressor 114. Details of the junction 150 of the EGR passage 180 and the intake passage 42 is shown in FIG. 2.

In further embodiments, the engine system may include a high pressure EGR (HP-EGR) flow path wherein exhaust gas is drawn from upstream of turbine 116 and recirculated to the engine intake manifold 122, downstream of compressor 114. A plurality of sensors may also be coupled to EGR passage 180 for providing details regarding the composition and condition of the EGR. For example, a temperature sensor may be provided for determining a temperature of the EGR, a humidity sensor may be provided for determining a humidity or water content of the EGR, and an air-fuel ratio sensor may be provided for estimating an air-fuel ratio of the EGR. Alternatively, EGR conditions may be inferred by the one or more temperature, pressure, humidity, and air-fuel ratio sensors coupled to the compressor inlet.

Exhaust from the one or more exhaust manifold sections may be directed to turbine 116 to drive the turbine. The combined flow from the turbine and the wastegate then flows through emission control device 170. In one example, the emission control device 170 may be a light-off catalyst. In general, the exhaust after-treatment device 170 is configured to catalytically treat the exhaust flow, and thereby reduce an amount of one or more substances in the exhaust flow. For example, the exhaust after-treatment device 170 may be configured to trap $NO_x$ from the exhaust flow when the exhaust flow is lean, and to reduce the trapped $NO_x$ when the exhaust flow is rich. In other examples, the exhaust after-treatment device 170 may be configured to disproportionate $NO_x$ or to selectively reduce $NO_x$ with the aid of a reducing agent. In still other examples, the exhaust after-treatment device 170 may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regeneratable soot filter configured to trap and oxidize soot particles in the exhaust flow. In this way, the exhaust after-treatment device 170 may be a diesel particulate filter (DPF), a three way catalyst (TWC), a $NO_x$ trap, a $NO_x$ catalyst, selective catalytic reduction (SCR) system, various other emission control devices, or combinations thereof. In some embodiments, the EGR delivery passage 180 may be coupled to the exhaust passage 126 upstream of exhaust aftertreatment device 170 as pictured in FIG. 1. In other embodiments, the EGR delivery passage 180 may be coupled to the exhaust passage 126 downstream of one or more exhaust aftertreatment devices 170.

Engine system 100 may further include control system 24. Control system 24 is shown receiving information from a plurality of sensors 26 (various examples of which are described herein) and sending control signals to a plurality of actuators 28 (various examples of which are described herein). As one example, sensors 26 may include MAP sensor 124, exhaust temperature sensor 128, exhaust pressure sensor 129, compressor inlet temperature sensor, compressor inlet pressure sensor, ambient humidity sensor, IAT sensor, engine coolant temperature sensor, and EGR sensor. Other sensors such as additional pressure, temperature, air/fuel ratio, and composition sensors may be coupled to various locations in engine system 100.

The actuators 28 may include, for example, throttle 20, EGR valve 152, wastegate 92, and fuel injector 66. The control system 24 may include a controller 22. The controller 22 may receive input data from the various sensors, process the input data, and trigger various actuators in response to the processed input data based on instruction or code programmed therein corresponding to one or more routines.

In some examples, vehicle system 102 may be a hybrid vehicle with multiple sources of torque available to one or more vehicle wheels 55. In other examples, vehicle system 102 is a conventional vehicle with only an engine, or an electric vehicle with only electric machine(s). In the example shown, vehicle system 102 includes engine 10 and an electric machine 52. Electric machine 52 may be a motor or a motor/generator. Crankshaft of engine 10 and electric machine 52 are connected via a transmission 54 to vehicle wheels 55 when one or more clutches 56 are engaged. In the depicted example, a first clutch 56 is provided between crankshaft and electric machine 52, and a second clutch 56 is provided between electric machine 52 and transmission 54. Controller 22 may send a signal to an actuator of each clutch 56 to engage or disengage the clutch, so as to connect or disconnect crankshaft from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation.

FIG. 2 shows a cross-sectional view 200 of the junction 150 of the EGR passage 180 and the intake passage 42. The junction 150 in FIG. 2 may be the junction 150 shown within the dashed box in FIG. 0.1. At the junction 150, an end of the EGR passage 180 may surround (enclose) the intake passage. The junction 150 may be radially symmetric about a central axis 250 of the intake passage 42 and in this example, details of an upper portion of the cross-section of the junction 150 are shown. A co-ordinate system 201 is included to show the x, y, and z axes.

An end 282 of the EGR passage 180 at the junction 150 may include a first curved wall 216 on a first side and a second curved wall 218 on a second side. The width of the EGR passage 180 at the end 282 (enclosed between the first curved wall 216 and the second curved wall 218) may be wider than that of the EGR passage upstream of the junction 150. The wider end of the EGR passage may enclose the intake passage 42. The first curved wall 216 and the second curved wall 218 may be asymmetric about the y-z plane passing through a central axis (not shown) of the EGR passage 180 with the first curved wall 216 extending directly up to the outer wall of the intake passage 42 while the second curved wall 218 may not directly extend to the outer wall of the intake passage 42. The first curved wall 216 may directly merge with the intake passage 42 while second curved wall 218 may end in an angled section 226 of the EGR passage 180 which then merges with the intake passage 42.

The intake passage 42 may include a first segment 208 parallel to a central axis 250 of the intake passage, a second segment 209 angled relative to the central axis, and a third segment 232 parallel to the central axis, a radius of the first segment 208 larger than a radius of the third segment 232. In one example, the angled second segment 209 forms a conical surface and may be substantially parallel to the angled section 226 of the EGR passage 180. An annular slot 224 may be formed between the angled second segment 209 of the intake passage and the angled section 226 of the EGR passage 180. The angles of the conical surfaces may be chosen to allow for the annular slot 224 to remain constant along the flowpath as the radius changes, or may be chosen to increase or decrease the area of the annular slot along the flowpath. Furthermore, the surfaces need not be conical in shape, but could instead be curved in the section view. The annular slot 224 may be angled with respect to a horizontal plane such as the x-z plane. In one example, the angle between a central axis of the annular slot and the horizontal plane may be in a range of 10°-45°. Overall, the annular slot 224 may form a conical shape converging from the second curved wall 218 of the EGR passage 180 into third segment 232 of the intake passage 42.

The annular slot 224 provides an opening for the EGR gas in the EGR passage 180 to enter the intake passage 42. The width R1 of the intake passage 42 at the point of introduction of the EGR into the intake passage may be given by the distance between the central axis 250 and the angled second segment 209 of the intake passage. The width R2 of the EGR passage 180 at the point of introduction of EGR to the intake passage may be given by the distance between the central axis 250 and the angled section 226 of the EGR passage 180. R1 may be smaller than R2. The width of the annular slot 224 may be given by R2−R1.

The shorter dashed line arrows 204 show the incoming EGR flow entering the intake passage 42 via the angled annular slot 224 and the longer dashed line arrows 206 show the fresh air flowing through the intake passage 42. As the EGR is introduced to the intake passage 42, due to the angle of the annular slot 224, the EGR flow may remain substantially proximal to the wall of the third segment 232 of the intake passage 42 downstream of the junction 150. The fresh air may remain substantially proximal to the horizontal axis 250. The flow of EGR may remain substantially parallel to the flow of fresh air through the intake passage downstream of the junction 150. The EGR may remain largely separated from the fresh (ambient) air stream and the two fluids may not substantially mix upstream of the compressor. In this way, the EGR flow and the fresh air flow may remain stratified within the intake passage 42 downstream of the junction 150 upon merging of the EGR with the flow of intake air. This stratified (unmixed) flow of fluid comprising EGR (along the wall of the third segment 232 of the intake passage 42) and the fresh air (along the center of the intake passage) may enter the compressor (not shown).

As the stratified fluid flows through the compressor, the hotter EGR may pass through portions of the blades proximal to the periphery of the compressor while the cooler fresh air may pass through portions of the blades at or near the center of the compressor. In this way, each portion of the blades of the compressor is exposed to a similar temperature and density of fluid through the operation of the compressor without substantial variation. The consistency in temperature and density of fluid flowing through each region may increase steady operation of the blades and improve efficiency of the compressor.

A speed of fresh air flow (S1) and a speed of EGR flow (S2) through the intake passage upstream of the compressor (downstream of junction 150) may be different. S1 and S2 may be a function of the volume of air flow (V1) through the intake passage and the volume of EGR flow (V2) through the same region of the intake passage, respectively. As an example, the volume of air flow may be directly proportional to the radius R1 of the intake passage 42 at the point of introduction of the EGR into the intake passage, and the volume of EGR flow may be directly proportional to the width R2−R1 of the annular slot 224.

In one example, R2 may be 120% of R1 resulting in a flow area for EGR to be ~44% of the flow area for fresh air. The volume of EGR flow (V2) may be 50% of volume of air flow (V1). Since the volume flow percentage (50%) is higher than the area percentage (44%), the EGR flow velocity may be somewhat higher than the air velocity as the two streams join. The higher velocity EGR flow may be present along the periphery (wall) of the intake passage while the lower velocity air flow may be near or at the center of the intake passage. The velocity of fluid flowing through the intake passage may decrease from the periphery towards the center of the intake passage. After the unmixed EGR and fresh air enter the compressor, the fluids may mix uniformly.

As an example, the two fluids may mix to form a substantially uniform mixture as they pass through the compressor wheel exducer, diffuser and volute of the compressor and in the downstream passages such as between the charge air cooler (such as cooler 118 of FIG. 1) and the throttle. In this way, an unmixed fluid stream is passed into the compressor while a homogeneous mixture of EGR and fresh air is delivered to the engine cylinders.

The temperature variation in the fluid flowing into the compressor is shown in FIG. 3. A map 300 shows temperature variation of fluid within the intake passage immediately upstream of an intake compressor (and downstream of the junction 150 shown in FIGS. 1-2). The map 300 shows temperature variation across a cross section of the intake passage. In one example, the cross-section may be taken along y-z plane of the third segment 232 of the intake passage 42 in the coordinate system 201, as shown in FIG. 2. The fluid within the intake passage may include EGR towards the outer periphery and fresh air towards the center of the passage. Curves (contour lines) 301, 302, 304, 305, 306, 308, 310, 312, 314, and 316 show approximate regions of constant temperature.

The temperature corresponding to each curve may decrease progressively from curve 301 to curve 316 with the temperature at curve 301 being highest and the temperature at curve 316 being lowest. As an example, the temperature corresponding to the curve 301 may be 412 K while the temperature corresponding to the curve 316 may be 298 K. In each region enclosed by two curves, the temperature may decrease from the outer curve towards the inner curve. As an example, in the region bound by curves 301 and 302, the temperature reduces from curve 301 to curve 302. The temperature within the region bound by the innermost curve 316 may be the lowest.

It is observed from the non-uniform temperature profile of fluid within the intake passage that the warmer EGR has not mixed with the cooler fresh air. The hottest fluids (primarily EGR) are limited to the outermost section of the passage with the cooler fluids (primarily fresh air) are limited to the central portion of the passage.

In this way, the components of FIGS. 1-2 enable a system for a vehicle comprising: an exhaust gas recirculation (EGR) passage enclosing an intake passage at a junction of the EGR passage and the intake passage, and an angled annular slot formed between the intake passage and the EGR passage, the annular slot configured to supply EGR to the intake passage. The annular slot and the intake passage are configured to maintain the supplied EGR parallel and proximal to a wall of the intake passage while fresh air flows through a central region of the intake passage, the EGR not significantly mixing with the fresh air. Further downstream, the EGR may flow through the periphery of the compressor blades while the fresh air flows through a central region of the blades. By confining fluid of different densities and different temperatures to separate regions of the compressor blades, uniformity of operation and compressor efficiency may be improved.

An example method for an engine in a vehicle comprises: flowing unmixed recirculated exhaust gas (EGR) and ambient air into an intake compressor with the ambient air flowing to a center of the intake compressor and the EGR flowing along a periphery of the intake compressor inlet. In the preceding example, additionally or optionally, the EGR is introduced at an angle to an intake passage at a junction of an EGR passage and the intake passage upstream of the intake compressor. In any or all of the preceding examples, additionally or optionally, the EGR passage encloses the intake passage at the junction of the EGR passage and the intake passage. In any or all of the preceding examples, additionally or optionally, the introduction of the EGR at the angle is through an annular slot formed between a wall of the EGR passage and a wall of the intake passage at the junction. In any or all of the preceding examples, additionally or optionally, the flow of EGR is substantially parallel to the flow of ambient air through the intake passage between the junction and the intake compressor. In any or all of the preceding examples, additionally or optionally, a speed of the flow of EGR is higher than a speed of the flow of the ambient air through the intake passage between the junction and the compressor, In any or all of the preceding examples, additionally or optionally, the speed of the flow of EGR is a function of a difference between a radius of the EGR passage and a radius of the intake passage at the junction. In any or all of the preceding examples, additionally or optionally, the flow of EGR is proximal to the wall of the intake passage while the flow of ambient air is through a central region of the intake passage between the junction and the compressor. In any or all of the preceding examples, additionally or optionally, a temperature of the flow of EGR proximal to the wall of the intake passage is higher than a temperature of the flow of ambient air through the central region of the intake passage between the junction and the compressor.

Another example method for an engine in a vehicle, comprises: an exhaust gas recirculation (EGR) passage enclosing an intake passage at a junction of the EGR passage and the intake passage, and an angled annular slot formed between the intake passage and the EGR passage, the annular slot configured to supply EGR to the intake passage. In the preceding example, additionally or optionally, the junction of the EGR passage and the intake passage is upstream of an intake compressor. In any or all of the preceding examples, additionally or optionally, the intake passage includes a first segment parallel to a central axis of the intake passage, a second segment angled relative to the central axis, and a third segment parallel to the central axis, a radius of the first segment larger than a radius of the third segment. In any or all of the preceding examples, additionally or optionally, the EGR passage includes a curved wall on one side, the curved wall merging with the third segment of the intake passage via an angled section of the EGR passage. In any or all of the preceding examples, additionally or optionally, at the junction, the angled section of the EGR passage is parallel to the second segment of the intake passage, a first distance (R1) between the central axis and the angled section of the EGR passage greater than a second distance (R2) between the central axis and the second segment of the intake passage. In any or all of the preceding examples, additionally or optionally, a width of the annular slot is a difference between the first distance (R1) and the second distance (R2). In any or all of the preceding examples, additionally or optionally, the annular slot and the third segment of the intake passage is configured to maintain the supplied EGR parallel to and proximal to a wall of the intake passage while fresh air flows through a central region of the intake passage, the EGR not mixing with the fresh air. In any or all of the preceding examples, additionally or optionally, the intake compressor includes blades, the EGR flowing through periphery of the blades while the fresh air flowing through a central region of the blades.

Another example for an engine in a vehicle, comprises: an intake compressor coupled to an intake passage, an exhaust turbine coupled to an exhaust passage, an exhaust gas recirculation (EGR) passage coupled to the exhaust passage downstream of the exhaust turbine at a first end and to the intake passage upstream of the intake compressor at a second end, and an angled annular slot formed between the intake passage and the second end of the EGR passage configured to flow EGR to the intake passage at an angle, the EGR flow being substantially parallel to a stream of fresh air entering the intake compressor. In any of the preceding examples, additionally or optionally, the second end of the EGR passage includes a first curved wall directly merging with a first straight section of the intake passage upstream of the annular slot, and a second curved wall merging with a second straight section of the intake passage downstream of the annular slot via an angled section of the EGR passage, the first curved wall and the second curved wall being asymmetric about a central plane of the EGR passage. In any or all of the preceding examples, additionally or optionally, the annular slot is formed between the angled section of the EGR passage and an angled section of the intake passage between the first straight section of the intake passage and the second straight section of the intake passage.

FIG. 2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/ below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/ lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for an engine in a vehicle, comprising:
an exhaust gas recirculation (EGR) passage enclosing an intake passage at a junction of the EGR passage and the intake passage, and an angled annular slot formed between the intake passage and the EGR passage, the annular slot configured to supply EGR to the intake passage, wherein the junction of the EGR passage and the intake passage is upstream of an intake compressor, wherein the intake passage includes a first segment parallel to a central axis of the intake passage, a second segment angled relative to the central axis, and a third segment parallel to the central axis, a radius of the first segment larger than a radius of the third segment, wherein the EGR passage includes a curved wall on one side, the curved wall merging with the third segment of the intake passage via an angled section of the EGR passage, wherein at the junction, the angled section of the EGR passage is substantially parallel to the second segment of the intake passage, a first distance (R1) between the central axis and the angled section of the EGR passage greater than a second distance (R2) between the central axis and the second segment of the intake passage.

2. The system of claim 1, wherein a width of the annular slot is a difference between the first distance (R1) and the second distance (R2).

3. The system of claim 1, wherein the annular slot and the third segment of the intake passage is configured to maintain the supplied EGR parallel to and proximal to a wall of the intake passage while fresh air flows through a central region of the intake passage, the EGR not mixing with the fresh air.

4. The system of claim 3, wherein the intake compressor includes blades, the EGR flowing through the periphery of the blades while the fresh air flowing through a central region of the blades.

5. A system for an engine in a vehicle, comprising:
an intake compressor coupled to an intake passage;
an exhaust turbine coupled to an exhaust passage;
an exhaust gas recirculation (EGR) passage coupled to the exhaust passage downstream of the exhaust turbine at a first end and to the intake passage upstream of the intake compressor at a second end; and
an angled annular slot formed between the intake passage and the second end of the EGR passage configured to flow EGR to the intake passage at an angle, the EGR flow being substantially parallel to a stream of fresh air entering the intake compressor, wherein the second end of the EGR passage includes a first curved wall directly merging with a first straight section of the intake passage upstream of the annular slot, and a second curved wall merging with a second straight section of the intake passage downstream of the annular slot via an angled section of the EGR passage, the first curved wall and the second curved wall being asymmetric about a central plane of the EGR passage, wherein the annular slot is formed between the angled section of the EGR passage and an angled section of the intake passage between the first straight section of the intake passage and the second straight section of the intake passage.

* * * * *

UNITED STATES PATENT AND TRADEMARK OFFICE
CERTIFICATE OF CORRECTION

PATENT NO. : 11,591,991 B1
APPLICATION NO. : 17/446276
DATED : February 28, 2023
INVENTOR(S) : Gregory McConville et al.

It is certified that error appears in the above-identified patent and that said Letters Patent is hereby corrected as shown below:

In the Specification

Column 1 Line 4, insert:
--This material is based upon work supported by the U.S. Department of Energy under Award Number DE-EE0008878. The government has certain rights in the invention.--.

Signed and Sealed this
Ninth Day of May, 2023

Katherine Kelly Vidal
*Director of the United States Patent and Trademark Office*